United States Patent
Green et al.

(10) Patent No.: US 9,071,374 B2
(45) Date of Patent: Jun. 30, 2015

(54) SYSTEM AND METHOD OF REAL TIME SYNCHRONIZATION THROUGH A COMMUNICATION SYSTEM

(75) Inventors: Christopher Green, Austin, TX (US); Claudius Becker, Ubstadt-Weiher (DE)

(73) Assignee: SMSC Europe GmbH, Karlsruhe (DE)

( * ) Notice: Subject to any disclaimer, the term of this patent is extended or adjusted under 35 U.S.C. 154(b) by 1637 days.

(21) Appl. No.: 12/245,005

(22) Filed: Oct. 3, 2008

(65) Prior Publication Data

US 2009/0092210 A1    Apr. 9, 2009

(30) Foreign Application Priority Data

Oct. 4, 2007  (EP) .................................. 07117896
May 29, 2008 (EP) .................................. 08157150

(51) Int. Cl.
*H04L 12/28* (2006.01)
*H04J 3/06* (2006.01)
*H04L 12/44* (2006.01)

(52) U.S. Cl.
CPC ............. *H04J 3/0605* (2013.01); *H04J 3/0661* (2013.01); *H04J 3/067* (2013.01); *H04L 12/44* (2013.01)

(58) Field of Classification Search
USPC .................................................. 370/335–503
See application file for complete search history.

(56) References Cited

U.S. PATENT DOCUMENTS

| | | | |
|---|---|---|---|
| 3,885,106 A * | 5/1975 | Deutsch ........................ | 370/381 |
| 4,224,473 A * | 9/1980 | Kaul et al. .................... | 370/505 |
| 4,346,470 A * | 8/1982 | Alvarez et al. ................ | 370/324 |
| 4,587,651 A * | 5/1986 | Nelson et al. ................. | 370/405 |
| 4,910,507 A * | 3/1990 | Shimizu et al. ............... | 370/419 |
| 5,007,051 A * | 4/1991 | Dolkas et al. ................. | 370/235 |
| 5,189,671 A * | 2/1993 | Cheng .......................... | 370/471 |
| 5,299,193 A * | 3/1994 | Szczepanek .................. | 370/463 |
| 5,305,317 A * | 4/1994 | Szczepanek .................. | 370/257 |
| 5,321,819 A * | 6/1994 | Szczepanek .................. | 709/228 |
| 5,537,549 A * | 7/1996 | Gee et al. ..................... | 709/224 |
| 5,553,095 A * | 9/1996 | Engdahl et al. ............... | 375/222 |
| 5,872,820 A * | 2/1999 | Upadrasta .................... | 375/356 |
| 5,889,781 A * | 3/1999 | Eftimakis et al. ............ | 370/509 |
| 5,907,685 A * | 5/1999 | Douceur ....................... | 709/248 |
| 6,101,180 A * | 8/2000 | Donahue et al. ............. | 370/352 |
| 6,308,066 B1 * | 10/2001 | Ranta et al. .................. | 455/436 |
| 6,377,998 B2 * | 4/2002 | Noll et al. .................... | 709/236 |
| 6,470,393 B1 * | 10/2002 | Heinrich et al. ............. | 709/238 |
| 6,487,406 B1 * | 11/2002 | Chang et al. ................ | 455/422.1 |
| 6,729,929 B1 * | 5/2004 | Sayers et al. ................. | 455/446 |
| 6,996,387 B2 * | 2/2006 | Chan ............................ | 455/301 |
| 6,999,501 B1 * | 2/2006 | Sawyer ........................ | 375/147 |

(Continued)

FOREIGN PATENT DOCUMENTS

EP     1189374       3/2002
WO     2007/093435   8/2007

*Primary Examiner* — Nicholas Sloms
(74) *Attorney, Agent, or Firm* — Kevin L. Daffer; Daffer McDaniel LLP

(57) ABSTRACT

A communication system, network, interface, and port architecture are provided for transferring data via a network. The network can be configured by connecting ports in a daisy chain arrangement to achieve a ring architecture or topology. The network transmits data according to a specific protocol. A first port transmits frames containing frame count information which is divided into several pieces, with each piece being transmitted in a single frame. A second port receives the frames, stores them in a frame buffer, and reassembles the frame count information from a plurality of frames.

17 Claims, 3 Drawing Sheets

(56) References Cited

U.S. PATENT DOCUMENTS

| | | | |
|---|---|---|---|
| 7,167,449 B2* | 1/2007 | Ikeda et al. | 370/235 |
| 7,184,408 B2* | 2/2007 | Denton et al. | 370/244 |
| 7,230,957 B2* | 6/2007 | Kang et al. | 370/535 |
| 7,499,500 B2* | 3/2009 | Page | 375/295 |
| 7,596,378 B1* | 9/2009 | Nizri et al. | 455/448 |
| 7,603,080 B2* | 10/2009 | Richenstein et al. | 455/3.06 |
| 7,908,540 B2* | 3/2011 | Jeong et al. | 714/758 |
| 2002/0105933 A1* | 8/2002 | Higuchi | 370/338 |
| 2004/0047424 A1* | 3/2004 | Ramaswamy et al. | 375/240.27 |
| 2004/0234000 A1* | 11/2004 | Page | 375/259 |

\* cited by examiner

SYSTEM AND METHOD OF REAL TIME SYNCHRONIZATION THROUGH A COMMUNICATION SYSTEM

PRIORITY CLAIM

This United States Patent Application claims priority from pending European Patent Applications 07117896.6 filed on Oct. 4, 2007 and 08157150.7 filed on May 29, 2008.

BACKGROUND OF THE INVENTION

1. Field of the Invention

The invention relates to a communication system, ports of the communication system; and a method for managing a communication system, and relates particularly to a synchronous communication system formed as a ring network of two or more ports coupled in daisy chain fashion to each other to allow communication.

2. Description of the Prior Art

A generally known communication system permits communication between nodes interconnected by a transmission line. Each node can transmit information and receive information via the transmission line. A communication system of interconnected nodes can be organized to have various topologies, such as a bus, ring, star, or tree topology, or a combination thereof.

A bus topology network is generally regarded as being linear. Transmissions from one node propagate along the transmission line and are received by all other nodes connected to a bus. A ring topology network, however, generally consists of a series of nodes connected to each another by unidirectional transmission links to form a single, closed loop. Examples of a ring network are described in IEEE 802.5 and Fiber Distributed Data Interface (FDDI).

A chosen transmission line between nodes can be either wired or wireless, for example via copper wire or fiber optics, or via a wireless transmission medium.

For real-time applications or for transferring synchronous streaming data, a communication system must have low latency and low transmission overhead. In addition, it is often necessary to synchronize clocks between nodes, and further to provide a time reference for all nodes.

U.S. Pat. No. 5,907,685 discloses a method of time synchronization between network nodes, based on extensive bidirectional communication. Such bidirectional communication imposes a significant load on the network when performed regularly at short intervals. Furthermore, significant computing power is required for evaluating communicated data.

BRIEF SUMMARY OF THE INVENTION

A problem to be solved by the invention is to distribute a common real-time clock via a network to a plurality of network nodes with minimum differences of time between the individual nodes. Furthermore, high precision of timing synchronization should be possible. The requirements of memory and processing power should be low.

To solve the above problems, the invention provides a first communication port configured for generating frames, comprising a transit frame counter for counting generated frames, related entities like bits, bytes or video frames transmitted into a network, or time intervals, with each frame having at least a preamble, a data field, and a frame count field, wherein a bit value count of the transit frame counter is divided into a predetermined number n of segments, and each segment is placed in a respective frame count field of n consecutive frames.

The invention also provides a second communication port configured for decoding frames having at least a preamble, a data field, and a frame count field, wherein the communication port is configured for re-assembling a value of a transient frame counter by evaluating the frame count field of n consecutive frames.

The invention further provides a communication system comprising at least one first communication port as set out above; and at least one second communication port as set out above.

The invention further provides a first network node comprising a first communication port as set out above and also a second network node comprising a second communication port as set out above.

The invention furthermore provides a network node comprising at least one first communication port as set out above; and at least one second communication port as set out above.

In addition, the invention provides a method for transmitting frame count information via a communication system by repeating the steps of: counting a number of transmitted frames; storing the number of transmitted frames; generating a set of n frames which each comprise at least a start identifier for marking a beginning of a frame, a data field, and a frame count field containing only 1/n of a number of bits representing the stored number of transmitted frames, where n consecutive frame count fields represent the stored number of transmitted frames; and transmitting the frames via the communication system.

Furthermore, the invention provides a method for receiving frame count information from a communication system by repeating the steps of: receiving a set of n frames which each comprise at least a start identifier for marking a beginning of a frame, a data field, and a frame count field containing only 1/n of a number of bits representing a stored number of transmitted frames, where n consecutive frame count fields represent a stored number of transmitted frames; storing the counts of frame count fields of consecutive n frames; and compiling a received number of transmitted frames from n received frame count fields.

BRIEF DESCRIPTION OF THE DRAWINGS

In the following the invention will be described by way of example, without limitation of the general inventive concept, on examples of embodiment with reference to the drawings.

DETAILED DESCRIPTION

Figure 1:
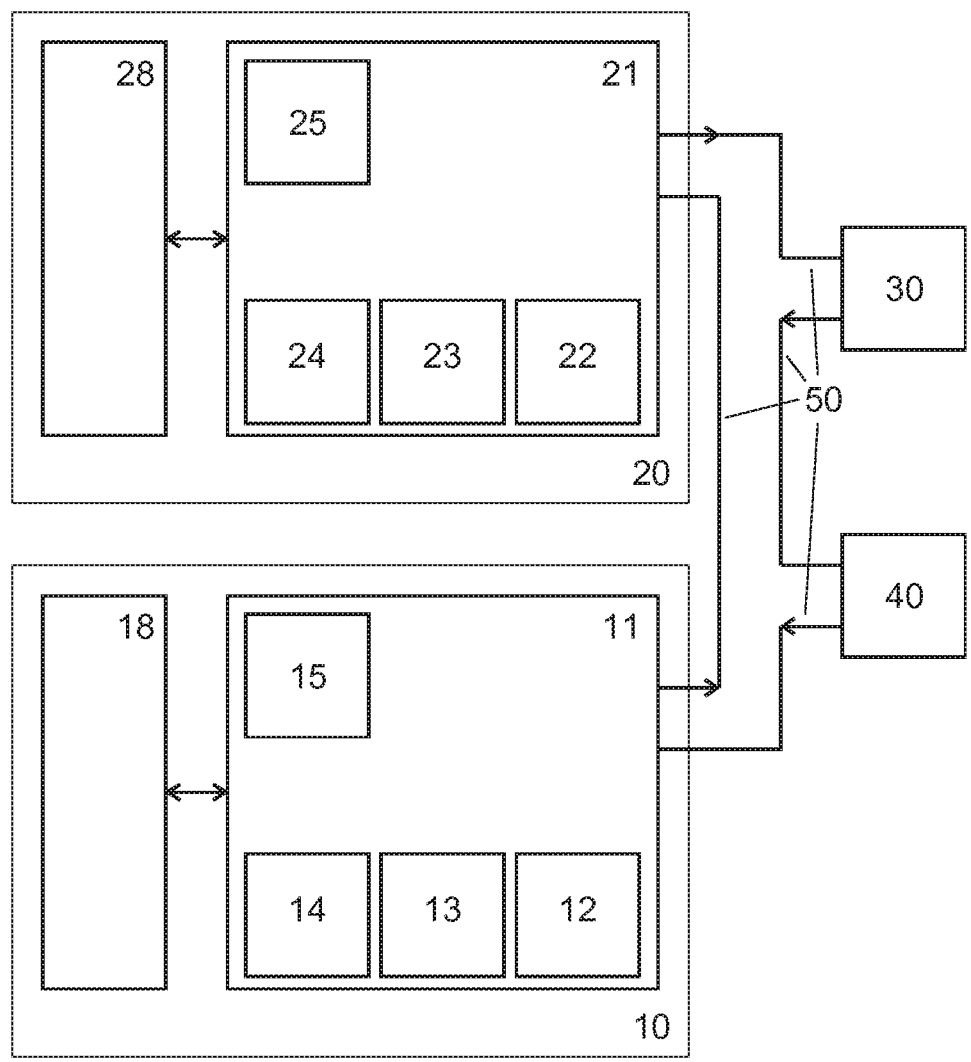
FIG. 1 shows network nodes and a communication system according to be invention.

FIG. 1 shows a preferred embodiment according to the invention. A first network node 10, a second network node 20, a third network node 30, and a fourth network node 40 are connected via network lines 50 to form a network. It is evident that there may be a different number of network nodes connected to the network. A minimum network comprises the first network node 10 and the second network node 20.

The first network node 10 has a first application 18 which exchanges data with a second application 28 at the second network node 20. The first application 18 may be a video source like a camera, and the second application 28 may be a video sink like a monitor.

Furthermore, the first network node 10 comprises a first communication port 11. This communication port 11 has a framer 12 for generating frames, clocked by the clock generator 15. Furthermore, a transmit frame counter 13 for counting transmitted frames, and a transmit frame count register 14 for storing the count value from the transmit frame counter 13 for each n frames are provided. As described in more detail in reference to FIG. 2, framer 12 assembles frames comprising frame count fields 62, wherein the frame count field 62 of each frame 60 contains part of the information from the transmit frame counter 13 or the frame count register 14.

The second network node 20 comprises a second communication port 21. This communication port 21 has a frame buffer and decoder 22 for buffering and decoding received frames. It is clocked by a clock generator 25 which is preferably synchronized with the received frames or bits thereof. Furthermore, a receive frame counter 23 is provided for counting received frames. A receive frame counter register 24 serves for assembling the frame count information from n frame count fields 62 received in successive frames 60, as shown in FIG. 2.

Figure 2:
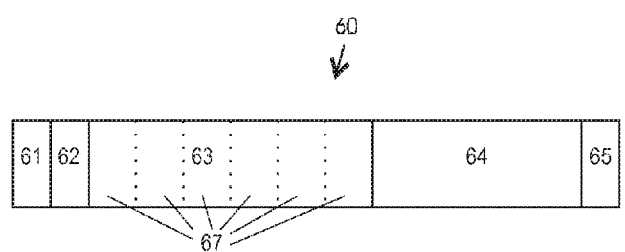
FIG. 2 shows an example of a data frame according to the invention.

FIG. 2 shows an example of a data frame 60 according to the invention. This frame 60 comprises a field preamble 61 which identifies the beginning of a frame, and may contain additional synchronization bits. Furthermore, it comprises a frame count field 62 containing frame count information derived from the transmit frame counter. The fields 63 and 64 are used for transferring synchronous data and asynchronous data which is also called the payload. The fields may be divided into bit groups 67. At the end of the frame 60 control bits 65 are transmitted. These bits may contain at least a checksum and additional information.

Figure 3:
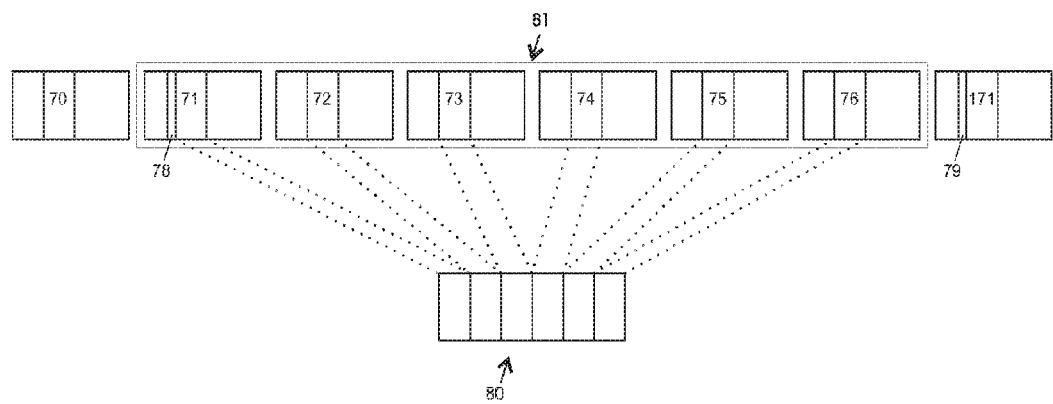
FIG. 3 shows a plurality of frames carrying frame count information.

FIG. 3 shows a sequence of frames according to the invention. Within these frames the frame count fields 70-76 contain frame count information. Frame count field 70 belongs to a first set of frames. The six frame count fields 71 to 76 belong to a second set of frames. The frame count field 171 belongs to a third set of frames. The beginning of the second set of frames is marked by the frame count start identifier 78, while the beginning of the third set of frames is marked by the frame count start identifier 79. The count values from the frame count fields 71 to 76 are assembled by a second communication port 21 in a receive frame counter register 80 which represents the transmit frame counter value as transmitted by a first communication port 11.

Figure 4:
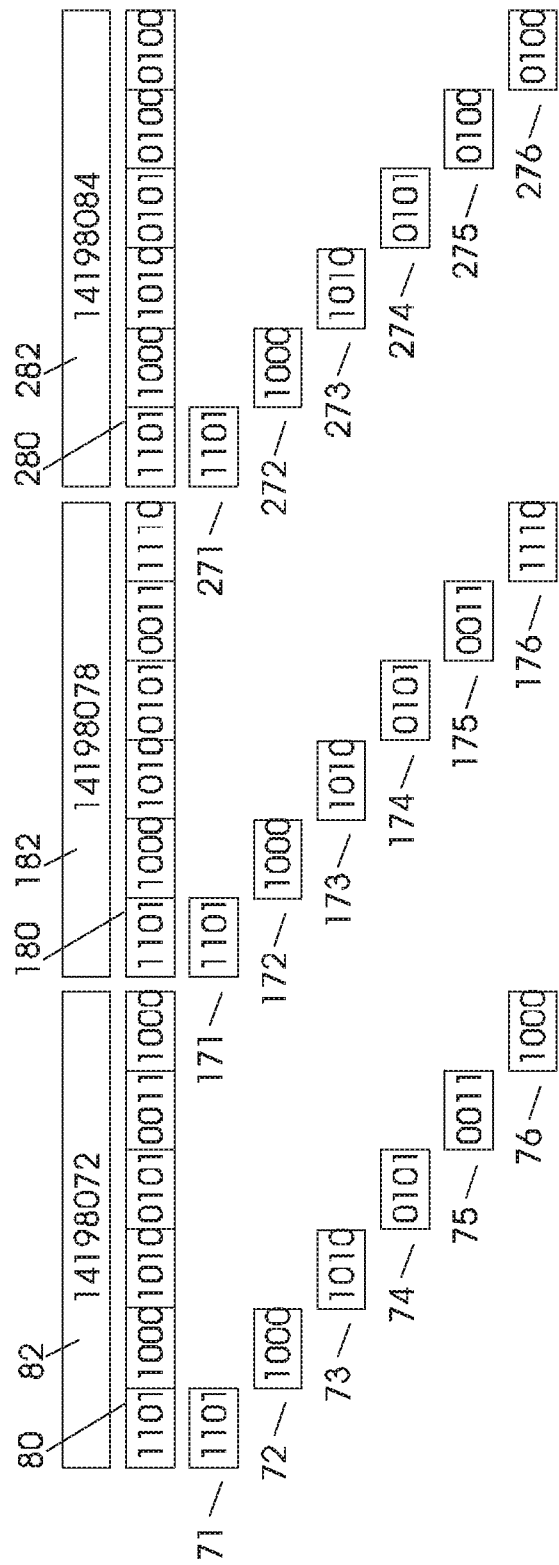
FIG. 4 shows an assignment of frame counter values to frame count fields of individual frames.

FIG. 4 shows an assignment of frame counter values to the frame count fields of individual frames in detail. In this example the transmit frame counter is shown in three different states. In a first state before transmission of the second set of frames, the transmit frame counter 82 has a count of 14198072. Preferably this value is stored in a memory. The binary representation of this number (1101 1000 1010 0101 0011 1000) is divided into n=6 packets of four bits length and transmitted by means of the frame count fields 71-76 of each frame to a receiver. The receiver successively receives these packets of four bits length and stores them in the receive frame counter register 80. After a full set of frames (6 frames in this example) has been received, the contents of the receive frame counter register are again the binary representation of the counter value of the transmit frame counter. Preferably means of frame synchronization like control bits are provided to indicate the first frame count field of a set of frames. The receiver now has the same frame counter value as the transmit frame counter value at the time of starting the first frame of the second set of frames. From this frame counter value, real time information may be derived. To obtain precise time information, the delay caused by transmission of the full set of frames and the run time delay of the network components starting from the transmitter to the receiver also may be taken into consideration.

After the transmitter has transmitted the first set of frames, it increments the transmit frame counter in this example by the number of transmitted frames, which equals six. Accordingly, the new frame counter value is 14198078. Again the binary representation of the transmit frame counter 182 value (1101 1000 1010 0101 0011 1110) is stored in a memory and sent over the network as six individual frame count fields 171-176 of the third set of frames. These are again received by the receiver and assembled to a value in the receive frame counter register 180. The same applies to the fourth set of frames, starting with the next frame counter value 282 which is again increased by 6. It is obvious that this count can be increased by any predetermined value. Again the binary representation of this counter value is stored in a memory and sent via the network to six individual frame count fields 271-276 which again are reassembled by a receiver into the receive frame counter register 280.

Instead of using control bits for identifying the first frame count field of a set of frames, the receiver may compare the bit groups of frame count fields of individual frames. In a first step the frame count fields of frames which are n frames distant from each other are compared, where n is the number of frames in a set of frames. It is now assumed that n is less than (2^m)–the maximum number of states which can be represented by a frame count field of m bits per frame. In the present example, with a four bit frame count field, the maximum number of states is 16. Accordingly n is less than 16. Now between frame count fields that are n frames apart, which is six frames apart in the present example, the least significant frame count fields 76, 176, 276 change their values. In the second set of frames the least significant frame count field 176 has the value 1000. The third frame count field 176, being six frames apart, has the value 1110, and the fourth frame count field 276, being another six frames apart, has the value 0100. In contrast thereto, the higher order frame count fields, specifically the most significant frame count fields 71, 171, 271, being also six frames apart, remain unchanged. The receiver may now start assembling the frame count fields in the frame count register starting with a most significant frame count field 171 with unchanged bits over the frame count of field 71 and with a least significant frame count field a 176 with changed bits over the frame count field 76. In some cases not only the bits of the least significant frame count field change, but also bits of higher significance frame count bits change as the frame count field 275 in the present example. The described method still works in this case. For the rare case in which 6 successive frame count fields change, the set of frame count fields is skipped and the same method is repeated with the next 6 frame count fields.

For the case that n is equal to or greater than (2^m), the least significant frame count fields may not change. If for example 16 frames would belong to a group of frames, the bits of the 15th frame would change and the bits of the 16th frame would remain unchanged. This has to be taken into consideration when the frames are assembled in the receive frame counter register.

The invention provides a first communication port 11 which is configured to generate frames 60 comprising at least a preamble 61 for marking the beginning of a frame, a data field 63, and a frame count field 62. The frames 60 comprise a predetermined number of bits. Preferably the number of bits per frame is constant.

Furthermore; a transmit frame counter 13 is provided for counting the generated frames 60. The bit value of the transmit frame counter 13 is segmented into a predetermined number n of segments preferably having a constant size of m bits. The number m may be any number, preferably between 4 and 16, and may be for example 8 or 16. Preferably the size of the frame count field is also m bits. The individual segments are then inserted into the frame count fields 62 of consecutive frames 60. Accordingly after n frames, the complete transmit frame counter 13 has been packed into frames 60 and transmitted onto the network. Preferably the frames 60 are of constant size. The n frames 60 containing the value of one transmit frame counter 13 are referred to as a set of n frames 81. Each set of n frames 81 contains a different transmit frame counter value. Accordingly, the sets of n frames 81 are unique. These frames are assembled by the port. A separate framer may be included in the port. Subsequent to the assembly of the frame, by a framer for example, the frame is transmitted by the first communication port 11 via a transmission line 50.

A second communication port 21 receives data from the communication line. This communication port 21 has a frame buffer and decoder 22 for storing frames and for disassembling the frames or at least parts thereof. When receiving data, the second communication port 21 may first synchronize on a preamble 61, if available.

The second communication port 21 according to the invention is configured for decoding the frame count fields 62 of consecutive frames 60, and for reassembling the transmit frame counter value after receiving a set of n frames. For this purpose the second communication port 21 preferably has a receive frame counter register 24 in which the values of the frame count fields 62 of consecutive n frames 60 are transferred. After receiving a set of n frames 60 the second communication port 21 has received the full information on the transmit frame counter 13. Thus the receive frame counter register 24 contains the last transmitted value from the transmit frame counter 13. This receive frame counter register 24 represents a value corresponding to that of the transmit frame counter at transmit time. From this value the transmit time can be derived because the frames are of known size and known bit rate. The received frame counter value is delayed with respect to the transmitted transmit frame counter value for some time. Typically the delay of time is n frames in addition to some internal processing delay of the first and the second communication port and the propagation delay of the signals via the network. Such a delay may be added to the calculated time from the received frame counter values to generate a precise real time reference. In most cases this should not be necessary. For a video transmission, for example, a precise relative time reference may be sufficient, as the video signals travel via the network and are therefore delayed for the same amount of time as the frame counter value signals in the frame counter fields of frames.

Preferably the first communication port has a stable clock 15 for generating the bits and a transmit frame counter 13 for counting the number of generated frames 60. This clock 15 may be synchronized with a reference like a crystal oscillator or an audio or video source. Preferably a PLL is used therein.

In addition to the transmit frame counter 13 value, a frame count checksum value may be contained in the frame counter fields. Preferably such a frame count checksum is contained in the last of a set of n frames. This checksum is calculated on a basis of the frame counter fields of a set of n frames 81 or a subset thereof. The second communication port 21 would only update its received frame counter when a valid frame count checksum has been received.

In general, the transmit frame counter 13 preferably counts frames 60, but it may also count other entities. Such entities may be bits or bytes transmitted into the network. Even absolute or relative time intervals like seconds, milliseconds or microseconds may be counted. For this specific case, the transmit frame counter 13 counts individual bits, and the size of the frames may vary.

The transmit frame counter 13 may be preset to any value. Specifically when starting up communication, the transmit frame counter 13 may be set to zero or to a value representing the time of day, or to any master time reference, or to any other number like zero. It may also be preset during operation, for example when there is a significant difference from the actual time of day or from the master time reference.

Preferably the transmit frame counter 13 of the first communication port 11 is incremented just before the first segment of the counter value is assembled into a frame. Accordingly, the transmit frame counter 13 is incremented for each n frames and represents 1/n of the frames transmitted.

In a further embodiment the transmit frame counter 13 of the first communication port 11 is incremented by n counts just before the first segment of the counter value is assembled into a frame and the assembly of a set of n frames starts. Accordingly, the transmit frame counter 13 is incremented by n for every n frames and represents the number of the frames transmitted. Between the individual frames of a set of n frames 81, the transmit frame counter 13 should not be incremented, because this would scramble the value. If there is a transmit frame counter 13 which is incremented for each frame 60, there should be a latch on the transmit frame counter register 14 which holds the counter value prior to assembly of the first counter value into a frame. The transmit frame counter register 14 value is then used for a set of n frames 81.

Preferably the frame count fields 62 in the frames may contain parts of a binary or BCD encoded counter value.

To identify the first frame of a set n frames 81 there preferably is a frame count start identifier 78, 79. This may be a bit or a plurality of bits at a predetermined position in the frame. It need not necessarily be part of the frame count field. The frame count start identifier 78, 79 also may be a unique value in the frame count field 62. Such a unique value may also be a coding violation. Preferably the frame count start identifier 78, 79 marks the first frame of a set of n frames 81. Alternatively it may precede the first frame. As a further alternative, the frame count start identifier 78, 79 may mark any predetermined frame.

A frame count start identifier 78, 79 is not necessarily provided. It is also possible to identify the sequence of frame count fields 62, because the high order bits change slowly and the low order bits change between sets of n frames 81. Any method of evaluation may be used in the second communication port 21. Preferably the start of a new set of n frames 81 may be identified after comparing the frame count fields 62 of at least two sets of n frames 81. The low order bits will have changed while the high order bits remain constant. Accordingly, in case the high order bits are transmitted first, the first time field which has unchanged bits after a frame count field with changed bits identifies the high order bits. After having identified such a field, a receive port may start writing the frame count fields in a receive frame counter register.

Depending upon the time resolution required at the second communication port 21, a receive frame counter 23 for counting received frames may be provided. This receive frame counter may be synchronized with the receive frame register every n frames. In addition there may be provided a bit counter for counting individual bits. This bit counter may be synchronized with the receive frame counter, or it may only count the bits of a frame or of a set of n frames. In any case the second communication port can derive a higher resolution time reference by using the bit timing in conjunction with the receive frame counter.

Preferably the second communication port 21 has a stable local clock 25 for synchronizing its receiver on the bits transferred via the network. Preferably there is a PLL to synchronize a local oscillator to the bits transferred via the network. This local oscillator preferably has frequency which is higher than the bit frequency.

A communication system according to the invention comprises at least a pair of communication ports 11, 21 as described above. Preferably there is a higher number of communication ports 11, 21.

A bus node or network node 10, 20 according to the invention comprises at least a communication port 11 having the features of at least one of the first communication port 11 and the second communication port 21.

A method according to the invention for transmitting frame count information via a communication system comprises a repetition of the following steps: counting the number of transmitted frames; storing the number of transmitted frames; and generating a set of n frames, each comprising at least a start identifier for marking the beginning of a frame, a data field, and a frame count field containing only 1/n of the number of bits representing a stored number of transmitted frames, while n consecutive frame count fields represent the stored number of transmitted frames.

A method according to the invention for receiving frame count information via a communication system comprises a repetition of the following steps: receiving a set of n frames, each comprising at least a start identifier for marking the beginning of a frame, a data field, and a frame count field containing only 1/n of the number of bits representing a stored number of transmitted frames, while n consecutive frame count fields represent the stored number of transmitted frames; storing the frame count fields of consecutive n frames; and assembling a received number of transmitted frames from the n received frame count fields.

The invention allows easy resynchronization after a maximum of approximately 2*n frames, typically within 2*n−1 frames, even if time reference is completely lost or a port is connected to the network. If resynchronization has started just after the second frame of a set of n frames has been transmitted, the second port should wait until it can receive a full set of n frames starting with the first frame of this set. With an optimized recognition procedure, the time for resynchronization may be even reduced to n frames. In addition, the overhead for transferring time and/or frame count information is very low, as each frame contains only 1/n of the full time information. With the invention an extremely precise long time synchronization may be performed. On the one hand, long time synchronization may be achieved by transferring transmit frame counter values which may also contain time of day values with high resolution. An example should demonstrate the efficiency of the invention. In a 125 Mbit/s bus system 1 million frames are transmitted per second. The frame count information is distributed over n=6 frames, each having frame count fields comprising 8 bit words. Accordingly, the timing information would be 48 bits wide. A 48 bit wide transmit frame counter would overrun once a year when counting frames at the frame rate of 1 million frames per second. On the other hand, very precise clock synchronization can be achieved by using a clock generator 25 in the second communication port 21, which synchronizes on the bits contained in the frames transmitted by the first communication port 11. These bits are synchronized with a clock generator 15 of the first communication port 11. Accordingly, the clock generator 25 of the second communication port 21 may run synchronously with the clock generator 15 of the first communication port 11. The precision of this clock synchronization is only limited by the jitter of the transmission lines of the network. It is typically in the range of some nanoseconds.

The invention claimed is:

1. A communication port, comprising:
    a framer for generating frames for transmission over a network, wherein each frame comprises at least a preamble, a data field, and a frame count field;
    a transmit frame counter for counting the generated frames; and
    wherein a count value of the transmit frame counter is divided into a predetermined number n of segments, wherein n is an integer value greater than 1, and wherein each segment is placed, by the framer, in a respective frame count field of n consecutively generated frames.

2. The communication port according to claim 1, further comprising a stable clock for generating the frames, which can be synchronized with a reference clock selected from a group consisting of a crystal oscillator, an audio source, or video source.

3. The communication port according to claim 1, wherein at least one of the n consecutively generated frames contains a frame count checksum for the frame count fields included within n consecutively generated frames.

4. The communication port according to claim 1, wherein prior to generating the count value, the count value of the transmit frame counter is preset to a predetermined value, a value representing a time of day, or any master time reference.

5. The communication port according to claim 1, wherein the count value of the transmit frame counter is incremented by one only once before a first frame of a set of n consecutive frames is generated, or the count value of the transmit frame counter is incremented by n before a first frame of a set of n consecutive frames is generated.

6. The communication port according to claim 1, further comprising a transmit frame count register for storing the count value of the transmit frame counter for the n consecutively generated frames, wherein the stored count value is used for generating the frame count fields of the n consecutively generated frames.

7. The communication port according to claim 1, wherein at least one of the n consecutively generated frames contains a frame count start identifier defining a first frame of the n consecutively generated frames.

8. The communication port according to claim 1, further comprising a network node at least partially containing said communication port.

9. A communication port, comprising:
    a frame decoder for decoding frames received over a network from another communication port, wherein the received frames each comprise at least a preamble, a data field, and a frame count field;
    a receive frame counter for counting the received frames; and
    a receive frame counter register for reassembling a count value of a transmit frame counter contained within the other communication port by evaluating the frame count field of n consecutively received frames.

10. The communication port according to claim 9, wherein the communication port is configured for identifying a first of n consecutively received frames by evaluating changes in high order bits and low order bits between at least two consecutive sets of the n consecutively received frames, wherein n is an integer value greater than 1.

11. The communication port according to claim 9, further comprising a network node at least partially containing said communication port.

12. A communication system, comprising:
    at least one first communication port, comprising:
        a framer for generating frames for transmission over a network, wherein each frame comprises at least a preamble, a data field, and a frame count field; and
        a transmit frame counter for counting the generated frames;
        wherein a count value of the transmit frame counter is divided into a predetermined number n of segments, and wherein each segment is placed, by the framer, in a respective frame count field of n consecutively generated frames; and
    at least one second communication port configured for receiving the frames transmitted over the network by the first communication port, decoding the received frames, and reassembling the count value of the transmit frame counter by evaluating the frame count fields of n consecutively generated frames.

13. A method for transmitting frame count information via a communication system by repeating the steps of:
    counting a number of frames to be transmitted in a transmit frame counter of a communication port;
    storing the number of frames to be transmitted in a transmit frame count register of the communication port;
    generating a set of n frames to be transmitted in a framer of the communication port, wherein each frame comprises at least a start identifier for marking a beginning of a frame, a data field, and a frame count field containing only 1/n of a number of bits representing the stored number of frames, wherein n consecutive frame count fields represent the stored number of frames; and
    transmitting the frames via the communication system.

14. A method for receiving frame count information from a communication system by repeating the steps of:
    receiving a set of n frames at a communication port, wherein each frame comprises at least a start identifier for marking a beginning of a frame, a data field, and a frame count field containing only 1/n of a number of bits representing a stored number of frames transmitted via the communication system, where n consecutive frame count fields represent the stored number of transmitted frames;
    storing, in a receive frame counter register of the communication port, the bits contained within the n consecutive frame count fields of the set of n frames; and
    compiling, in the receive frame counter register of the communication port, a received number of the transmitted frames from the n consecutive frame count fields.

15. A communication port, comprising:
    a framer for generating frames for transmission over a network, wherein each frame comprises at least a preamble, a data field, and a frame count field;
    a transmit frame counter for counting bits, bytes, video frames, or time intervals associated with the generated frames; and
    wherein a count value of the transmit frame counter is divided into a predetermined number n of segments, wherein n is an integer value greater than 1, and wherein each segment is placed, by the framer, in a respective frame count field of n consecutively generated frames.

16. A communication port, comprising:
    a frame decoder for decoding frames received over a network from another communication port, wherein the received frames each comprise at least a preamble, a data field, and a frame count field;
    a receive frame counter for counting bits, bytes, video frames, or time intervals associated with the generated frame; and
    a receive frame counter register for reassembling a count value of a transmit frame counter contained within the other communication port by evaluating the frame count field of n consecutively received frames, wherein n is an integer value greater than 1.

17. A communication system, comprising:
    at least one first communication port, comprising:
        a framer for generating frames for transmission over a network, wherein each frame comprises at least a preamble, a data field, and a frame count field; and
        a transmit frame counter for counting bits, bytes, video frames, or time intervals associated with the generated frames;
        wherein a count value of the transmit frame counter is divided into a predetermined number n of segments, and wherein each segment is placed, by the framer, in a respective frame count field of n consecutively generated frames, wherein n is an integer value greater than 1; and
    at least one second communication port configured for receiving the frames transmitted over the network by the first communication port, decoding the received frames, and reassembling the count value of the transmit frame counter by evaluating the frame count fields of n consecutively generated frames.

* * * * *